(12) United States Patent  (10) Patent No.: US 6,446,738 B1
Boyd  (45) Date of Patent: Sep. 10, 2002

(54) BLASTHOLE DRILL INCLUDING AN IMPROVED OPERATOR'S CAB

(75) Inventor: James W. Boyd, New Berlin, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 57 days.

(21) Appl. No.: 09/252,761

(22) Filed: Feb. 19, 1999

(51) Int. Cl.[7] ............................................... E21B 19/08
(52) U.S. Cl. ..................... 175/219; 175/122; 175/162; 180/89.12; 180/324
(58) Field of Search ................................. 175/219, 162, 175/122; 180/89.12, 324, 315; 296/190.01, 190.08, 190.1; 172/2, 292, 811, 431

(56) References Cited

U.S. PATENT DOCUMENTS

| | | | | |
|---|---|---|---|---|
| 3,734,210 A | * | 5/1973 | Wilderman | 175/85 |
| 4,026,379 A | * | 5/1977 | Dunn et al. | 180/77 S |
| 4,124,246 A | * | 11/1978 | Brown et al. | 296/28 |
| 6,039,141 A | * | 3/2000 | Denny | 180/329 |

* cited by examiner

Primary Examiner—David Bagnell
Assistant Examiner—Zakiya Walker
(74) Attorney, Agent, or Firm—James Earl Lowe, Jr.

(57) ABSTRACT

A drill comprising a frame supported for movement over the ground in a forward propel direction and a rearward propel direction, a mast mounted on the frame in a generally vertical position, and a drill head moveable up and down the mast. The drill head is selectively engageable with the upper end of a drill pipe so that the drill pipe is raised and lowered out of and into the ground when the drill head moves up and down the mast. The drill further includes a crawler drive for moving the drill in the forward propel direction, a motor for moving the drill head to cause drilling, and an operator's cab positioned on the frame adjacent the mast. The cab includes a first console and a second console spaced from the first console, controls on the first console for operating the forward propel drive, and controls on the second console for operating the drill head motor.

10 Claims, 2 Drawing Sheets

BLASTHOLE DRILL INCLUDING AN IMPROVED OPERATOR'S CAB

BACKGROUND OF THE INVENTION

This invention relates to a blasthole drill operator's cab, and, more particularly, to how the various consoles are positioned in the cab.

A type of drilling equipment known as a blasthole drill is widely used in surface mining and quarrying operations to drill holes of moderate depth. Explosives are lowered to the bottom of these holes and detonated to break up rock and other hard earth formations. This permits the excavation of the material disintegrated by the blast and allows expansion of the area being mined or quarried. This equipment is typically mobile—being mounted on a vehicle that travels on crawlers. The vehicle has a cab for operating personnel and a housing for the machinery that drives the unit. A long, pivoting mast or drill tower is disposed horizontally when the unit is on the move, and is set upright for vertical drilling operations. The mast carries a number of individually stored pipes arranged longitudinally therein. These pipes are connected one at a time in a drill string as a hole is being drilled. A movable carriage off the mast moves down and up the mast as the pipe moves into and out of the ground. An air hose supplies air to the drill string and power lines supply power to the carriage.

Current blasthole drill cab control panel consoles are located in one area of the blasthole drill cab. All controls are located on this panel. The operator must first locate the desired control, whether it is a control to operate the drilling apparatus, the pipe handling apparatus, or the jacking or propelling apparatus, from a sea of controls all on one panel.

Control recognition is difficult due to the large number of switches and controls the operator must distinguish from. A typical drill has roughly 55 controls or one console. Further, the controls are not placed in areas which allow both ready access to the control and visibility of the area which corresponds to the control task about to be performed.

SUMMARY OF THE INVENTION

This invention provides a drill comprising a frame supported for movement over the ground in a forward propel direction and a rearward propel direction, a mast mounted on the frame in a generally vertical position, and a drill head moveable up and down the mast. The drill head is selectively engageable with the upper end of a drill pipe so that the drill pipe is raised and lowered out of and into the ground when the drill head moves up and down the mast. The drill further includes means for moving the drill in the forward propel direction, means for moving the drill head to cause drilling, and an operator's cab positioned on the frame adjacent the mast. The cab includes a first console and a second console spaced from the first console, means on the first console for operating the forward propel means, and means on the second console for operating the drill head operating means.

Figure 1:
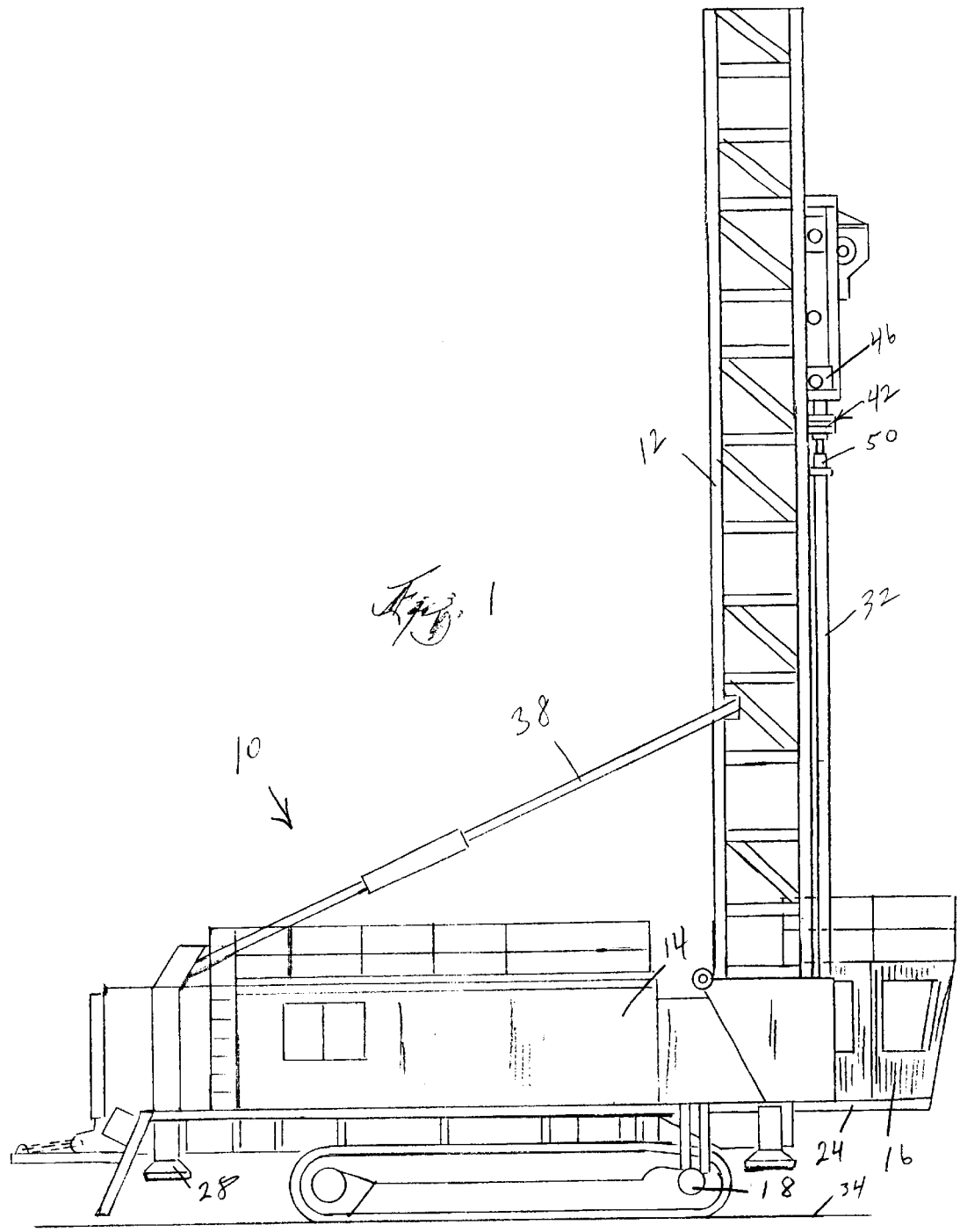
FIG. 1 is a side elevation view of a blasthole drill including an operator's cab embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

DETAILED DESCRIPTION OF THE PREFERRED EMBODIMENT

Figure 2:
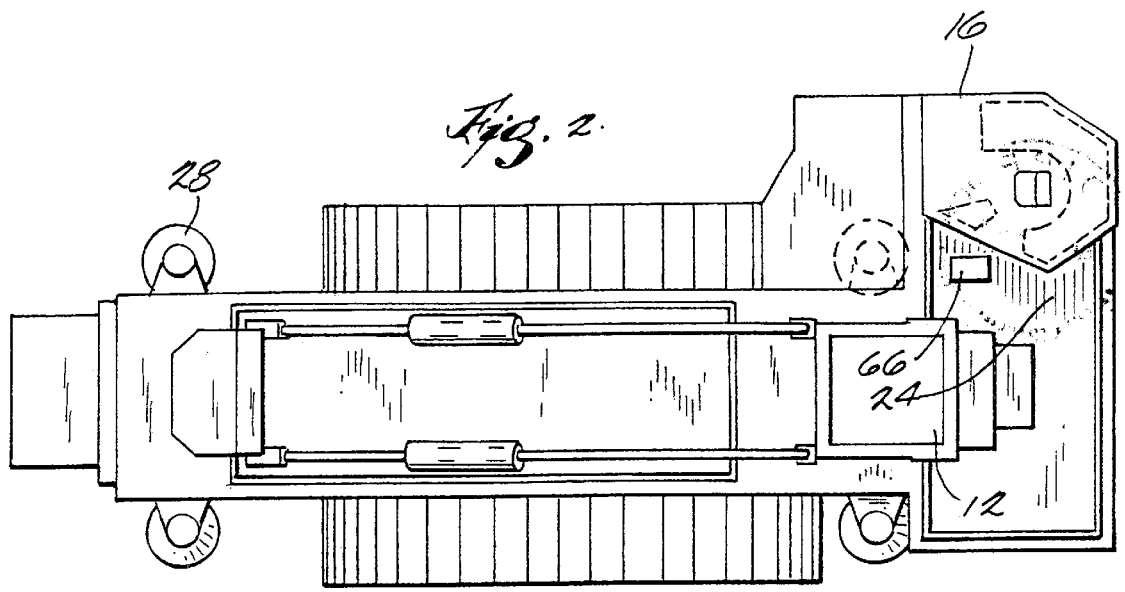
FIG. 2 is a top plan view of the blasthole drill of FIG. 1.

With reference to FIGS. 1 and 2, a blasthole drill 10 is shown as having a mast or drill tower 12, a machinery house 14, an operator's cab 16, a crawler drive 18, and a ladder (not shown) providing access to the cab 16 and machinery house 14. The machinery house 14 and cab 16 are supported on top of a frame or deck 24, and the deck 24 is supported by the crawlers for movement over the ground in a forward propel direction and a rearward propel direction. The drill tower 12 is pivotally corrected to the frame or deck 24 and supports a drill pipe 32 which projects through an opening (not shown) in the deck 24 and which extends downward into the ground 34. A plurality of drill pipes can be connected together to form a drill string. The invention can also be applied to units carried on different mobilizing elements, such as tire-bearing wheels.

Rising upwardly in FIG. 1, the elongated drilling mast 12 has been positioned for drilling a hole into the earth. When moved from place to place, the drilling mast 12 is carried horizontally along and just above the top of the machinery housing 14. At the drilling site, the unit 10 is stopped, raised off the crawlers 18 and stabilized using at least three leveling jacks 28 such as the one seen at the front end of the unit 10 in FIG. 1. The mast 12 is then raised to the vertical positions shown in FIG. 1. The mast 12 may also be tilted to angular drilling positions in increments of 5° from vertical, up to a maximum of 30° from vertical. The mast 12 is raised by operation of a hydraulic cylinder (not shown) and is supported by a brace 38, which is unfolded as the mast 12 is raised, and which is locked when the mast 12 reaches the desired position. Such a brace is disclosed in Lang et al, U.S. Pat. No. 3,805,463 issued Apr. 23, 1974.

The mast 12 is an open lattice structure with a longitudinal axis and having a back and two sides. There are two opposing tracks (not shown) extending longitudinally along the mast 12, and a movable carriage and drill head 42 is driven up and down along these tracks. The drill head 42 carries a rotatable coupling 50 with a downwardly opening, threaded socket that attaches to the upper end of the drill pipe 32. The drill head 42 also carries means for moving the drill head in the form of one or more motors 46 to rotatably drive the coupling and all pipes attached thereto. The motors may be electric, hydraulic or pneumatic.

As illustrated in the drawings, the operator's cab 16 is positioned on the deck 24 adjacent the mast 12 where the mast 12 is in the generally vertical position. The cab 16 includes multiple windows 52 to permit the operator to see in all directions, including in the forward propel direction 54, the rearward propel direction 58, and in the direction 62 of the mast 12 and drill head 42. An opening 66 is provided in the deck 24 between the cab 16 and the mast 12 to permit the operator to see where the pipe 32 enters the ground 34.

The cab 16 further includes a swiveling operator's chair 70, a first console 74 in the cab 16 on one side of the chair 70, and a second console 78 in the cab 16 on the generally opposite side of the chair 70. The second console 78 includes a first part 82 and a second part 86, the first part 82 being spaced from the second part 86. A wall 90 having a glass panel 94 is viewable between the first and the second parts, and a table 98 extends between the first and the second consoles. Means in the form of controls 102 are provided on the first console 74 for operating the forward and reverse propel means in the form of the crawler drive 18. Means in the form of controls 106 are provided on the second console 78 for operating the drill head motor 46.

Figure 3:
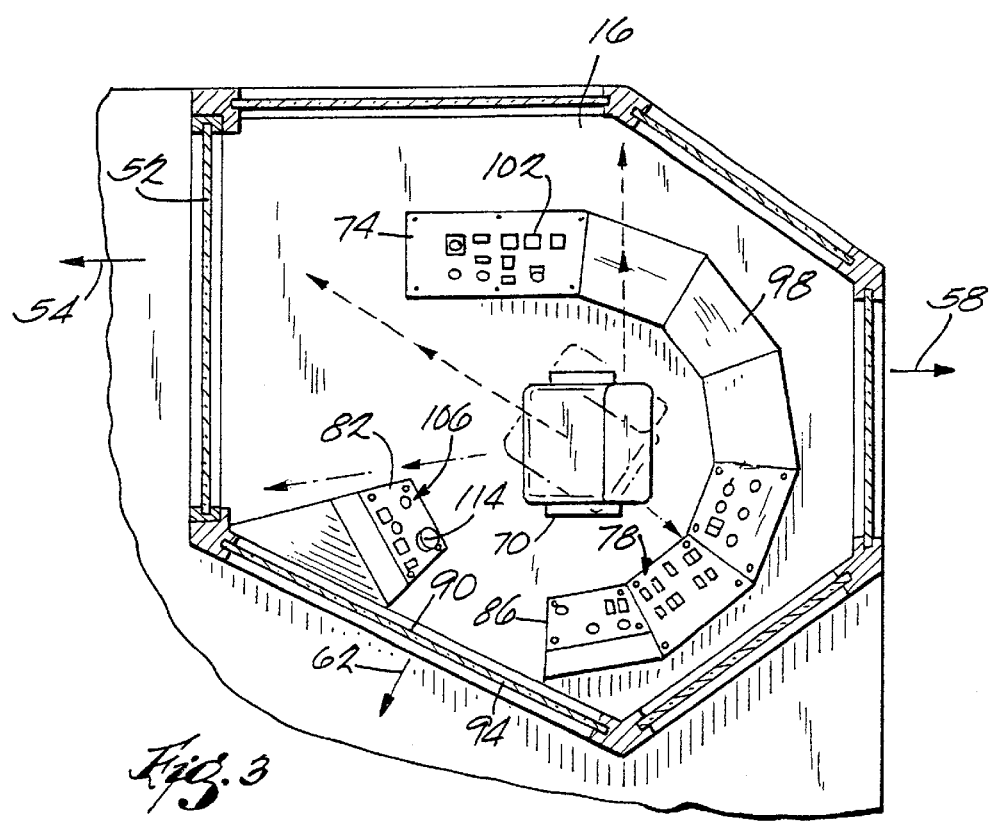
FIG. 3 is a top plan view of the inside of the operator's cab of the blasthole drill of FIG. 1.

The controls surrounding the operator are located in functional groups for easy control recognition. Further, each group is located where the operators control tasks corresponds to the operator's visibility demands. FIG. 3 shows the operator's chair positioned in the cab in a propel location. This chair location permits the operator to look out the cab window 52 to propel the machine in the forward direction. In this location the controls 102 on the first console 74 on the right hand side are the propel, engine, brake and jacking controls. The operator now only needs to be concerned with these controls when the drill 10 is propelling forward, not the controls 106 located in the second console 78 on the left hand side or behind the operator's back. This control layout lowers the quantity of controls the operator must distinguish from, thereby considerably aiding in control recognition. If the operator wishes to propel in the opposite direction, the operator can swivel the chair 70 to look out the rear cab windows and use the controls 102 for rearward propelling on the same console.

After the operator has propelled and jacked the drill 10 into the desired position, the operator will swivel the chair into a position where the mast 12, drill head 42 and drill pipe 32 can be observed. Now the operator is able to use the drilling controls 114 located on the second console first and second parts. At this time the operator is able to look out the upper and lower cab windows and through the deck opening 66 to have complete visibility of the drilling apparatus. Further, since the propel, engine and jacking controls 102 are out of the operator's sight, this reduces the number of controls the operator must distinguish from, thereby improving drill control recognition.

What is claimed is:

1. A drill comprising
    a frame supported for movement over the ground in a forward propel direction and a rearward propel direction,
    a mast mounted on said frame in a generally vertical position,
    a drill head moveable up and down said mast, said drill head being selectively engageable with the upper end of a drill pipe so that the drill pipe is raised and lowered out of and into the ground when said drill head moves up and down said mast,
    means for moving said drill in said forward propel direction,
    means for moving said drill head to cause drilling,
    an operator's cab having an interior and said cab being positioned on said frame adjacent said mast, said cab interior including an operator's chair, a first console on one side of said operator's chair, and a second console spaced from said first console and on a generally opposite side of said operator's chair, said second console including a first part immovable relative to said frame and a second part immovable relative to said frame and spaced from said first part, with no console part in between,
    means on said first console for operating said forward propel means, and
    means on said second console for operating said drill head operating means.

2. A drill according to claim 1 wherein said mast is pivotally mounted on said frame for movement between a generally horizontal position and a generally vertical position, and wherein said operator's cab is positioned on said frame adjacent said mast where said mast is in said generally vertical position.

3. A drill according to claim 1 wherein said operator's chair can swivel to permit an operator to swivel between the first and second consoles.

4. A drill according to claim 1 wherein said cab includes a wall having a glass panel viewable between said first and said second parts, and wherein said mast is viewable through said glass panel.

5. A drill according to claim 1 wherein said cab further includes a table extending between said first and said second consoles.

6. A drill according to claim 1 and further including means for moving said drill in a reverse propel direction and means on said first console for operating said rearward propel means.

7. A drill comprising a frame supported for movement over the ground in a forward propel direction and a rearward propel direction,
    a mast pivotally mounted on said frame for movement between a generally horizontal position and a generally vertical position,
    a drill head moveable up and down said mast, said drill head being selectively engageable with the upper end of a drill pipe so that the drill pipe is raised and lowered out of and into the ground when said drill head moves up and down said mast, means for moving said drill in said forward propel direction, means for moving said drill head to cause drilling,
    an operator's cab positioned on said frame adjacent said mast where said mast is in said generally vertical position, said cab including
    a swiveling operator's chair, a first console is in said cab on one side of said chair, and a second console in said cab on the generally opposite side of said chair, said second console including a first part immovable relative to said frame and a second part immovable relative to said frame, said first part being spaced from said second part, with no console part in between,
    a wall having a glass panel between said first and said second parts, a table extending between said first and said second consoles, and
    means on said first console for operating said forward propel means, and means on said second console for operating said drill head moving means.

8. A drill according to claim 7 and further including means for moving said drill in a rearward propel direction and means on said first console for operating said rearward propel means.

9. A drill comprising
    a frame supported for movement over the ground in a forward propel direction and a rearward propel direction,
    a mast mounted on said frame in a generally vertical position, a drill head moveable up and down said mast, said drill head being selectively engageable with the upper end of a drill pipe so that the drill pipe is raised and lowered out of and into the ground when said drill head moves up and down said mast, means for moving said drill in said forward propel direction, means for moving said drill head to cause drilling, an operator's cab including an interior and a wall having a glass panel, said cab being positioned on said frame adjacent said mast, said glass panel facing said mast, and said mast being viewable through said glass panel, said cab interior including an operator's chair, a first console on one side of said operator's chair, and a second console spaced from said first console, said second console including a first part immovable relative to said frame and a second part immovable relative to said frame and spaced from said first part, with no console part in between, said glass panel being between said first part and said second part, means on said first console for operating said forward propel means, and means on said second console for operating said drill head operating means.

10. A drill according to claim 9 wherein said second console is in said cab interior on the generally opposite side of said chair.

* * * * *